Dec. 6, 1949     H. W. WISHART     2,490,566
PACKING MEANS
Filed Nov. 30, 1944
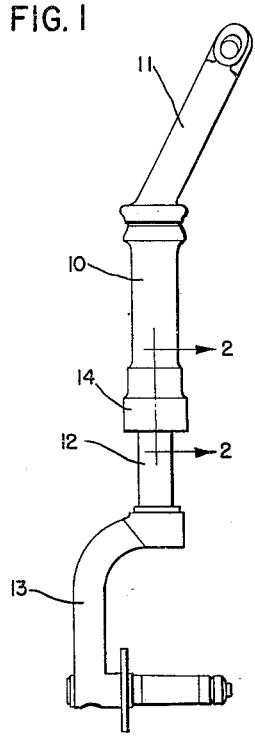
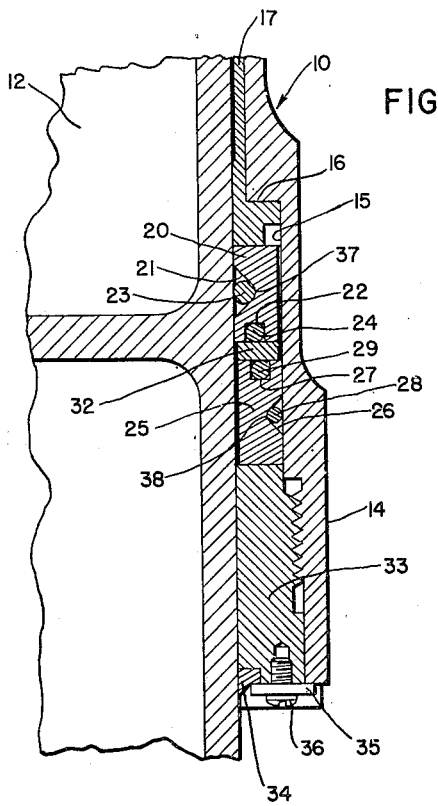
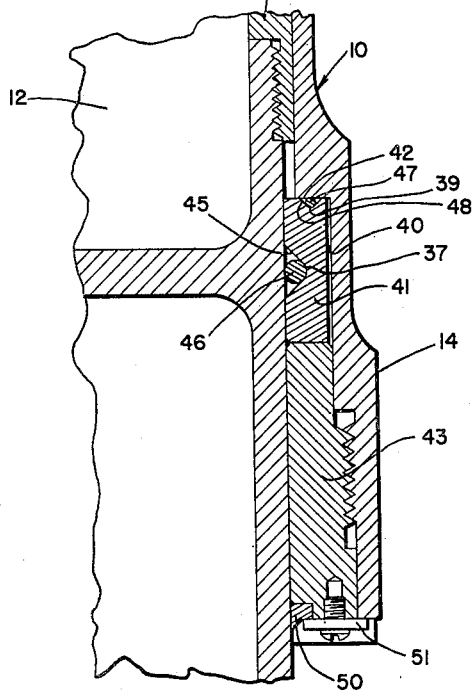
INVENTOR.
HERBERT W. WISHART
BY George F. Goodyear
ATTORNEY Patented Dec. 6, 1949

2,490,566

UNITED STATES PATENT OFFICE 2,490,566

PACKING MEANS

Herbert W. Wishart, University City, Mo., assignor to Curtiss-Wright Corporation, a corporation of Delaware Application November 30, 1944, Serial No. 565,934

1 Claim. (Cl. 286—35)

This invention relates generally to packings and sealing means and to improvements in fluid sealing arrangements between relatively movable bodies.

An important object of the invention is to provide an improved and highly effective fluid seal or packing between relatively movable bodies such as a cylinder and piston assembly.

It is also an object to simplify the construction and arrangement of a fluid seal or packing by eliminating the need for close tolerances and accurate fits between the several sealing means and the movable bodies.

A further object resides in the arrangement of a fluid seal which shall permit relative lateral movement between a cylinder and piston or equivalent bodies without affecting the completeness and effectiveness of the seal.

A still further object is to provide a sealing means which need have only one of its working surfaces accurately machined to match the bore of the cylinder or the circumferential surface of the piston as desired.

Yet a further object resides in the arrangement of a fluid seal between relatively movable bodies such that the transfer of loads therebetween shall not be experienced by the fluid seal.

These and other objects will be noted hereinafter in connection with a detailed description of the drawing, in which:

Figure 1 is an elevational view of an aircraft landing gear strut embodying this invention, Figure 2 is a greatly enlarged but fragmentary sectional detail of the strut to which the invention is applied, the view being taken at line 2—2 of Figure 1, and Figure 3 is a view similar to that of Figure 2 but showing a modified arrangement of the invention.

The present invention is shown in connection with the shock strut assembly of an aircraft landing gear since the same will provide a good example by which the nature of the improved packing may be explained and hence better understood.

Referring to the drawings for an understanding of this invention there is shown in Figure 1 a hydraulic shock strut of the type utilized in aircraft. This strut comprises a cylinder member 10 which is arranged to be mounted on a suitable part of the aircraft as by member 11. Working within the cylinder 10 there is a piston member 12 which is also a part of a wheel forked structure 13. The cylinder 10 is provided with an enlarged portion 14 in which is assembled a packing or hydraulic seal for preventing leakage of pressure fluid outwardly of the cylinder 10. The fluid reaction or damping effect thereof on the relatively movable parts 10 and 12 is well understood in the art and hence no disclosure thereof is deemed necessary.

Referring now to Figure 2 of the drawing there is shown in detail one form of the packing means which constitutes the basis of this invention. As shown, the enlargements 14 of the cylinder 10 is provided with an annular recess 15 near its open end. The recess thereby forms an annular shoulder or surface 16 against which a cylinder liner 17 is adapted to fit. The piston member 12 is slidably mounted within the cylinder liner and moves in adjacence with the recess 15 such that an annular chamber is formed by the walls of the recess and the wall of the piston. Mounted in this annular chamber is a first ring element 20 which is concentrically related with and closely fitted on the piston 12 and is loosely fitted within the annular chamber with respect to the circumferential wall of the recess. The ring is provided with an annular groove or tapered notch 21 opening toward the piston wall and with a second axially directed annular notch 22. Each of these notches is adapted to receive and retain suitable sealing means 23 and 24 respectively, each means being generally circular in cross section and formed of a resilient material. A second seal ring element 25 is also mounted in this annular chamber in a position axially spaced from the first ring member or element 20. The ring 25 is formed concentrically and in close fitting relation with the outer wall of recess 15 and loosely with the piston wall. Furthermore, the latter ring is provided with a groove or tapered notch 26 in its outer wall adjacent the wall of the recess and with an axially directed notch 27 which is in facing relation with the first mentioned axially directed notch 22. Each of these recesses is provided to receive an annular sealing element, as at 28 and 29, which is similar in form and material to those previously described. In order to make the sealing elements 24 and 29 effective to prevent the passage of fluid between the ring elements there is provided a spacer ring 32 which is adapted to lie between rings 20 and 25 to compress the sealing means into fluid sealing effectiveness by contact therewith.

The packing assembly just described is arranged to be positioned and retained in the annular chamber between the piston and cylinder walls by means of a bushing or closure ring 33 which is threadably mounted in the open end of the cylinder 10. This bushing thereby confines each of the ring members and the intermediate spacer against axial displacement by pressing the same against the end face of the cylinder liner 17. In order to prevent dirt and other deleterious matter from working into the annular chamber containing the packing means the bushing member is provided with a suitable outer recess to receive a wiper element 34 which is secured in operative adjacence to the cylinder wall 10 by means of a retainer ring 35 suitably secured on the bushing by machine screws 36.

In the packing arrangement just described it will be observed that the piston is free to reciprocate or operate axially of the cylinder 10 and is supported against lateral movement by a working or sliding contact with the cylinder liner 17 and the closure member or bushing 33. No lateral load or thrust is permitted to be carried by the ring members 20 and 25 by reason of the relative loose fit which each has with one of the telescopic body members and a concentric and close fit with the other telescopic body member. In a packing construction of this type the ring members tend to float with respect to the piston and cylinder but always maintain effective fluid seals by reason of the sealing elements 23, 24, 28 and 29 respectively.

A modified form of the presently described invention is illustrated in connection with Figure 3 in which the cylinder 10 is provided with an annular recess as at 40 for the reception of but a single seal ring 41 which is adapted to be confined against axial movement between the annular shoulder 42 of the recess and a closure member or bushing 43, the latter being threaded into the outer open end of the cylinder. Piston 12 has been modified to the extent that a threaded skirt portion 44 is now substituted in place of the separate cylinder liner 17 of the first form of the invention. The skirt 44 provides an outward extension from the circumferential wall of the piston for sliding engagement with the cylinder wall. Thus lateral movement of the piston 12 is transmitted to the cylinder 10 by the skirt member 44 and closure bushing 43.

Sealing ring member 41 is concentrically formed with respect to and closely fits piston 12 while the same has a loose fit with the internal wall of the recess 40. The ring element 41 is formed with an inwardly opening tapered notch 45 for the reception of a seal forming means 46 of annular configuration and circular cross section. A second seal forming means 47 which is in sealing engagement with the recess shoulder 42 is carried by the ring member 41 in a tapered notch 48 provided therefor. A wiper element 50 and securing plate 51 are also provided and mounted on the closure bushing 43 for the purpose of preventing dirt and deleterious matter from entering the fluid seal.

In the present construction each of the ring members is provided with a single concentric surface which matches with and closely fits a single cooperating surface on one or the other of the telescopically related bodies. Thus there is eliminated the requirement that each of the ring elements be machine formed with an outer and an inner surface concentric with respect to both the piston and cylinder. This is of great advantage because relative lateral movement between the piston and cylinder resulting from poor fit tolerances, wear of the parts and load deflections will not destroy the effectiveness of the fluid seal established by the floating ring elements and associated seal forming means. It is also apparent that machine work and construction costs for producing a packing assembly of the present type can be reduced to a considerable extent.

The floating ring elements improve the effectiveness of the fluid seal by providing separate and substantially independent seals for each of the moving parts. The seals herein preferred are of the "O" ring type now generally well known in the trade. The fluid seal for the piston and for the cylinder is further improved by forming the respective seal receiving grooves with inclined, tapered walls in which the bottom of the notch is rounded to equal the radius of curvature of the seal element to be retained thereby. In this way the movement of the piston or the floating movement of the ring elements will be ineffective to cause displacement of the seals. The tendency of a seal to move out of its notch will be overcome by the wedging action caused by the inclined surfaces of the tapered recess. This notch form is clearly shown in the drawing while the arcuate bottom surface thereof is indicated at 37, 38 and 39.

Certain modifications and alterations may be made in this invention without departing from the spirit and intended scope thereof and it is the aim hereof to cover such obvious changes by the claim hereinafter appearing.

What is claimed is:

In an assembly having inner and outer telescoping members, a bushing adjustably screw threaded into an annular recess in one end of the outer member, the inner face of the bushing slidably engaging the inner member, and said assembly providing an annular sealing chamber having plane end walls whose spacing is variable by screw adjustment of said bushing, and said chamber having substantially concentric inner and outer walls defined by said inner and outer members respectively, the combination therewith comprising: a ring of substantially rectangular cross-section disposed in said sealing chamber, the inner face of the ring having a sliding fit with said inner wall and the outer face of the ring having clearance from said outer wall, the end faces of the ring abutting said end walls, a first annular groove in said inner face of said ring and a second annular groove in one of said end faces, and a resilient packing ring disposed in each of said annular grooves for sealing engagement with the adjacent wall of said chamber.

HERBERT W. WISHART.

REFERENCES CITED

The following references are of record in the file of this patent:

UNITED STATES PATENTS

| Number | Name | Date |
| --- | --- | --- |
| 546,106 | Schmaltz | Sept. 10, 1895 |
| 2,360,731 | Smith | Oct. 17, 1944 |
| 2,368,137 | Hammond | Jan. 30, 1945 |
| 2,385,045 | Wallace | Sept. 18, 1945 |

FOREIGN PATENTS

| Number | Country | Date |
| --- | --- | --- |
| 710,360 | France | of 1931 |